United States Patent [19]
Dahl

[11] 3,872,656
[45] Mar. 25, 1975

[54] SAFETY SHUTTER DOOR ASSEMBLY FOR ROTARY LAWNMOWER GRASS CATCHER CHUTE

[75] Inventor: Einar S. Dahl, Galesburg, Ill.

[73] Assignee: Outboard Marine Corporation, Waukegan, Ill.

[22] Filed: Aug. 27, 1973

[21] Appl. No.: 391,934

[52] U.S. Cl. ................................ 56/202, 56/320.2
[51] Int. Cl. .......................................... A01d 55/18
[58] Field of Search ................... 56/320.2, 202, 17.4

[56] References Cited
UNITED STATES PATENTS
3,423,918  1/1969  Siwek .................................. 56/202
3,636,686  1/1972  Meyer et al ...................... 56/320.2

Primary Examiner—Robert Peshock
Assistant Examiner—J. N. Eskovitz
Attorney, Agent, or Firm—Michael, Best & Friedrich

[57] ABSTRACT

Disclosed herein is a rotary mower having a grass clipping discharge chute and a safety shutter door assembly including a door which is hingedly mounted on the blade housing and is spring loaded so as to automatically close and cover the discharge chute outlet anytime the mouth of grass collection bag is either intentionally or accidentally detached from the mower. The shutter door assembly includes a latching mechanism which releasably latches the door in the closed position so that it can not be opened by the impact of objects being propelled thereagainst by the cutter blade. In one embodiment, the shutter door assembly also includes a locking mechanism which cooperates with the collection bag so that, upon the attachment of the collection bag, the door is releasably locked in an open position.

8 Claims, 6 Drawing Figures

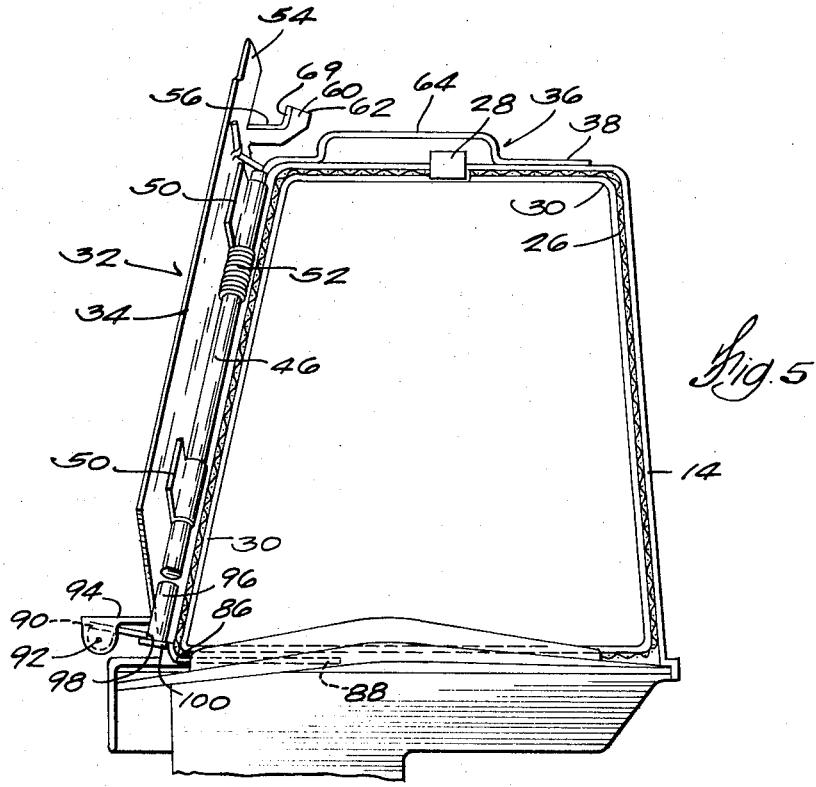
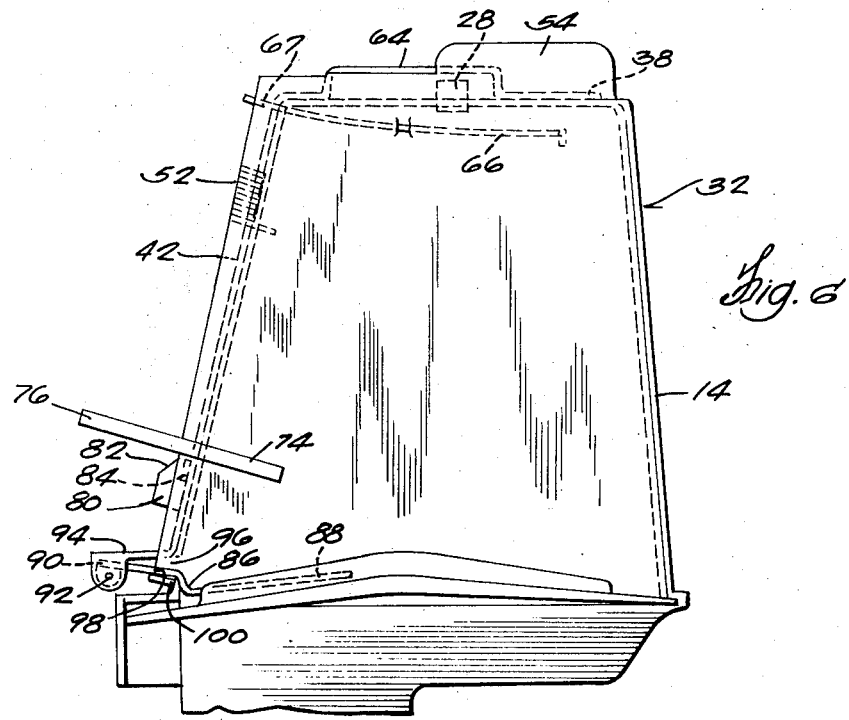

3,872,656

SAFETY SHUTTER DOOR ASSEMBLY FOR ROTARY LAWNMOWER GRASS CATCHER CHUTE

BACKGROUND OF THE INVENTION

The invention relates to rotary lawnmowers and, more particularly, to a safety shutter door assembly which automatically closes the grass catcher chute outlet of the rotary lawnmower whenever the grass collection bag is removed.

For collecting the grass clippings, rotary lawnmowers are provided with a collection bag which is releasably attached to the opening of a discharge chute on the mower blade housing. The grass clippings and other debris are discharged through the chute and into the collection bag by a high velocity air stream created by the circulating action of the cutter blade in the mower housing. Whenever the collection bag is removed from the discharge chute opening while the cutter blade is operating, objects, such as small stones, twigs, small pieces of glass or wire and the like, can be discharged through the chute at a high velocity, thereby representing a serious potential hazard to the operator and/or bystanders. This hazard can be minimized by insuring the lawnmower engine is shutoff every time the collection bag is being removed. However, during mowing, the collection bag can be removed accidentally by engagement with shrubs, trees, or similar obstructions, in which case the cutter blade normally will be operating.

Various safety devices have been proposed to eliminate this potential hazard. However, such prior art devices either complicate the installation and removal of the collection bag or do not provide complete protection. Example of prior art devices are described in the Meyer, et al., U.S. Pat. No. 3,636,686, issued Jan. 25, 1972, and the Haffner U.S. Pat. No. 3,721,078, issued Mar. 20, 1973.

SUMMARY OF THE INVENTION

The invention provides a rotary mower having a grass clipping discharge chute provided with a shutter door assembly which includes a door adapted to automatically close and cover the discharge chute outlet any time the grass collection bag is detached from the discharge chute, and means for releasably and positively latching the door in the closed position so that the impact of objects being propelled against the backside of the door by the cutter blade will not open the door.

Preferably, the shutter door is mounted on the mower blade housing to swing laterally about a generally vertical axis toward the mower engine so that the door is protected against engagement with obstructions, such as shrubs and the like, by the collection bag.

Also, in accordance with the invention, the shutter door assembly includes a spring connected to the door for urging the door toward the closed position, a latching bracket located adjacent the discharge chute outlet, a latching arm which extends from one edge of the door and engages the latching bracket, and means for releasably holding the latching arm in latching engagement with the latching bracket.

Also, in accordance with the invention, the shutter door assembly is provided with means which cooperates with the mouth of the collection bag to releasably lock the door in the open position while the collection bag is attached to the discharge chute outlet.

Preferably, the shutter door assembly includes a locking bracket located adjacent the discharge chute outlet, a locking member connected to the door for engaging the locking bracket when the door is open, means for biasing the locking member out of engagement with the locking bracket, and means which is connected to the door and which cooperates with the mouth of the collection bag to counteract the biasing force of the biasing means to thereby maintain the locking member in locking engagement with the locking bracket so long as the collection bag is attached to the discharge chute outlet.

One of the principal features of the invention is the provision of a rotary mower having means for preventing objects from being propelled through the grass clipping discharge chute by the rotating cutter blade when the grass collection bag is intentionally or accidentally detached from the discharge chute.

Another principal feature of the invention is the provision of a rotary mower including a shutter door assembly which includes a door adapted to automatically close and cover the discharge chute outlet when the grass collection bag is detached from the discharge chute, and means for releasably and positively latching the door in the closed position.

Another principal feature of the invention is the provision of such a rotary mower which further includes means for releasably locking the door in the open position while the grass collection bag is attached to the discharge chute.

Other features and advantages of the invention will become apparent upon reviewing the following detailed description, the drawing and the appended claims.

BRIEF DESCRIPTION OF THE DRAWINGS

FIG. 5 is a sectional view taken along the plane designated 5—5 in FIG. 1.

FIG. 6 is the same as FIG. 5 except the shutter door assembly is shown in the closed position.

DESCRIPTION OF THE PREFERRED EMBODIMENTS

Figure 1:
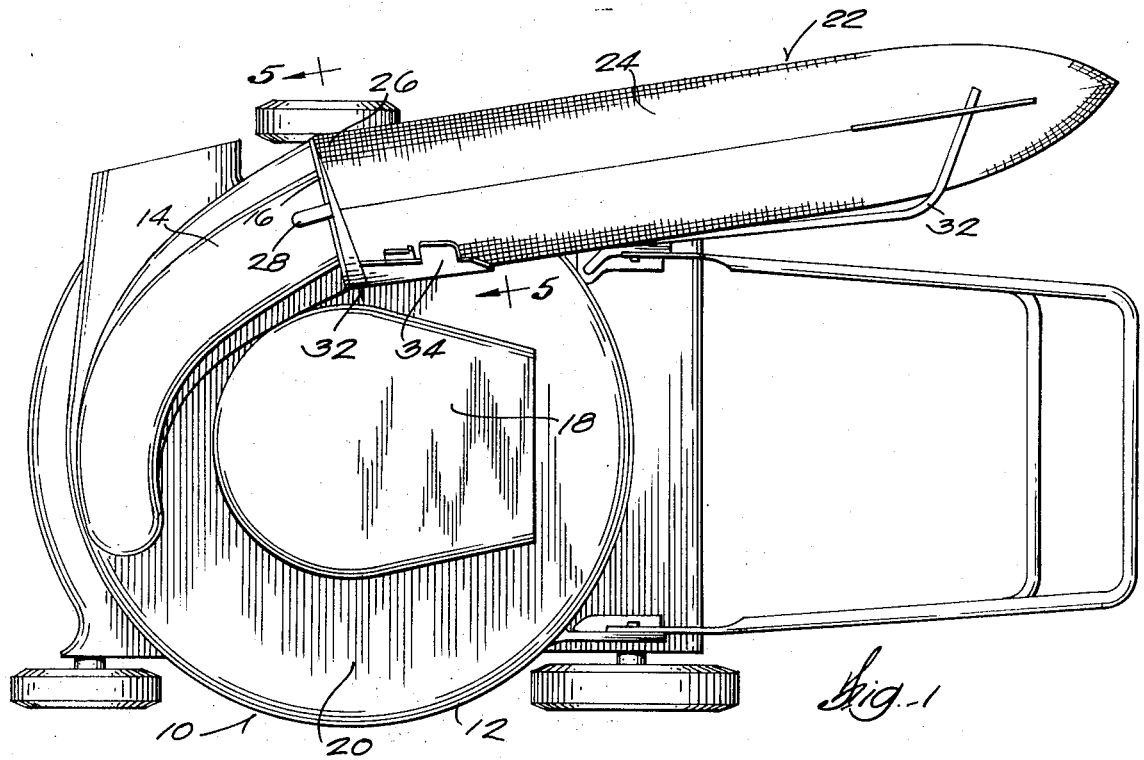
FIG. 1 is a top plan view of a rotary mower having mounted thereon a shutter door assembly in accordance with the invention.

Before explaining the invention in detail, it is to be understood that the invention is not limited in its application to the details of construction and the arrangements of the components set forth in the following description or illustrated in the drawings. The invention is capable of other embodiments and of being practiced and carried out in various ways. Also, it is to be understood that the phraseology and terminology employed herein is for the purposes of description and should not be regarded as limiting.

Referring to the drawings, FIG. 1 illustrates a rotary lawnmower 10 including a blade housing 12 having a grass clipping discharge chute 14 with an outlet 16. An engine 18 is carried on a blade housing deck 20. Attached to the lawnmower 10 for collecting the grass clippings is a collection bag 22 including a sack 24 which has a mouth 26 adapted for communication with the discharge chute outlet 16. The collection bag 22 is attached to the discharge chute outlet 16 by a releasable connection means, such as a spring latch 28, which engages a wire frame 30 (See FIG. 5) surrounding the mouth 26 of the sack 24. The air stream laden with grass clippings and other comminuted material is discharged from the blade housing 12 into the discharge chute 14 and enters the collection bag 22 through the mouth 26. The collection bag 22 is supported by a support rod 32 which extends upwardly from the blade housing deck 20.

The construction discussed thus far is conventional. Various alternate means can be used to attach and support the collection bag 22. Such means form no part of the invention so illustration or detailed description thereof is not necessary for a full understanding of the invention.

In accordance with the invention, there is provided a shutter door assembly which automatically closes the discharge chute outlet 16 whenever the collection bag 22 is intentionally or accidentally removed. In the construction illustrated and best shown in FIGS. 5 and 6, the shutter door assembly 32 includes a door 34 which is adapted to completely cover the discharge chute outlet 16 and a support frame assembly 36. The support frame assembly 36 includes an upper horizontal member 38 which extends above and is attached to the upper portion of the discharge chute 14 and a vertical side member 42 which extends along the inner side portion of the discharge chute 14. Mounted on the frame side member 42 is a generally vertically extending shaft or hinge pin 46. The door 34 at one side is supported on the hinge pin 46 by a pair of vertically spaced hinges 50 for swingable movement between a closed position and a open position about the generally vertical pivot axis provided by the hinge pin 46.

Figure 2:
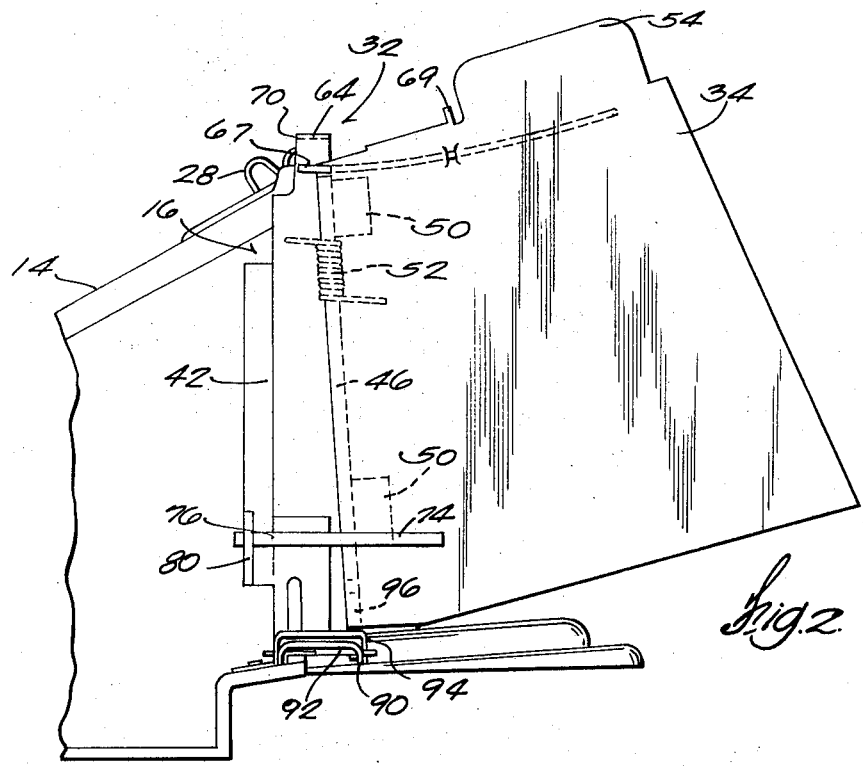
FIG. 2 is a fragmentary, side elevational view of the mower illustrated in FIG. 1, shown with the shutter door assembly in the open position and without a grass collection bag attached.
Figure 3:
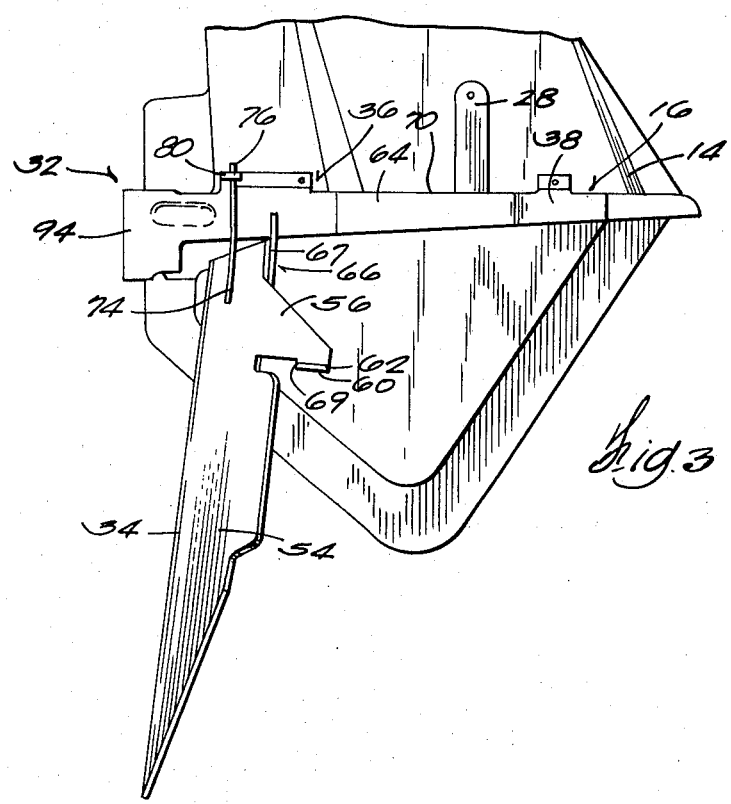
FIG. 3 is a fragmentary, top plan view of the mower illustrated in FIG. 1, shown with the shutter door assembly in the open position and without a grass collection bag attached.
Figure 4:
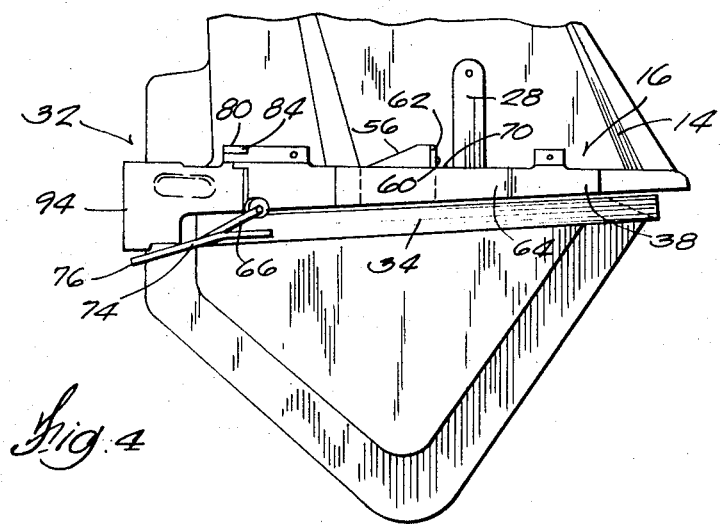
FIG. 4 is the same view as FIG. 3 except the shutter door assembly is shown in the closed position.

When in the closed position as shown in FIGS. 4 and 6, the backside of the door 34 completely covers the discharge chute outlet 16. When in the open position as shown in FIGS. 2, 3 and 5, the door 34 is swung to a location where there is unimpeded discharge of the grass clippings through the discharge chute outlet 16 and the collection bag 22 can be attached to the discharge chute 14 in the usual manner as shown in FIG. 1. As illustrated, the shutter door assembly 32 is preferably arranged so that the door 34 opens towards the engine 18. With this arrangement, the collection bag 22 provides protection for the door 34 and other operative components of the shutter door assembly 32 against engagement by shrubs and similar obstructions during normal mowing operations.

The door 34 is urged towards the closed position by a torsion spring 52 which surrounds the hinge pin 46 and which, at the opposite ends thereof, is secured to the frame side member 42 and the door 34, (See FIGS. 5 and 6). The hinges 50 and the torsion spring 52 are slidably mounted on the hinge pin 46 so as to permit relative vertical movement of the door. In order to facilitate grasping the door 34 for opening, a tab or extension 54 is provided on the upper portion of the door.

Also, in accordance with the invention means are provided for releasably and positively latching the door 34 in the closed position so that, after being closed, the door cannot be forcibly opened by the impact of an object hurled through the discharge chute 14 by the cutter blade. While various arrangements can be used, in the construction illustrated (See FIGS. 3 and 5), such means includes an upper latching arm 56 which extends laterally and forwardly from the upper edge of the door 34 and which has a generally, vertically extending ear 60 terminating in an upwardly and rearwardly inclined upper edge 62. Provided integrally with upper frame member 38 is a latching bracket including an arched section 64 under which the latching arm ear 60 can pass. The door 34 is urged upwardly with respect to the upper frame member 38 by a leaf spring 66 (See FIG. inner end which includes an inner portion 67 and which is secured to the door 34 in a manner so that the inner end portion 67 bears against and exerts a downward force on the hinge pin 46.

As the door 34 is urged towards the closed position by the torsion spring 52, the inclined upper edge 62 of the latching arm ear 60 bears against the underside of the arched section 64 and urges the door 34 downwardly against the biasing force of the leaf spring 66. When the latching arm 60 moves past the forward edge 70 of the arched section 64, the door 34 is urged upwardly by the leaf spring 66 and the vertical rear edge 69 of the ear 60 is engaged against the forward edge 70 of the arched section 69 to thereby securely latch the door 34 to the frame (See FIG. 4). Thus, a propelled object, such as a small stone or the like, impacting the backside of the door 34 will not force the door open.

Further in accordance with the invention, means are provided for releasably locking the door 34 in the open position so as to insure that the door does not interfere with normal discharge of the grass clippings into the collection bag 22 and to facilitate the attachment of the collection bag 22 to the discharge chute 14. While various arrangements can be used, in the construction illustrated, such means includes a lower locking member or arm 74 which is mounted on the front side of the door 34 and which includes an inner end portion 76 extending outwardly beyond the inner edge of the door 34 (See FIGS. 2 and 6). Extending from the side frame 42 is a locking bracket 80 which includes an upwardly inclined edge portion 82 and a generally vertical slot 84 for receiving the inner end portion 76 of the locking arm 74. As the door 34 is moved towards the open position, the inner end portion 76 of the locking arm 74 is forced upwardly along the inclined edge portion 82 of the locking bracket 80 and is eventually urged into the slot 84 to thereby lock the door 64 in the open position.

Since the door 34 is urged upwardly by the leaf spring 66, the locking arm 74 will tend to become unlocked from the locking bracket 80 unless the door is held down against the biasing force of the leaf spring 66. To accomplish this downward movement of the door 34, there is provided a trigger arm (See FIGS. 5 and 6) having an inner portion 88 which extends into the lower portion of the discharge chute outlet 16 and has an outer end portion 90 which is pivotally mounted, such as by a pin 92, on a support bracket 94 which is connected to the frame side member 42. Affixed to the door 34 is a pin 96 which extends through a slot 98 provided in the trigger arm 86 and includes a head 100 which engages the underside of the trigger arm 86.

The door 34 can be held downwardly to maintain the locking arm 76 in a locked position by applying a downward force on the inner portion 88 of the trigger arm 86. This can be accomplished during normal installation of the collection bag 22. That is, the lower portion of the collection bag frame 30 is placed against the trigger arm 86 and, as the upper portion of the collection bag mouth 26 is moved into position and secured to the discharge chute 14 by the latch spring 28, there is sufficient downward movement of the trigger arm 86 to provide the desired locking action (See FIGS. 2 and 5).

In operation, the grass collection bag 22 is installed by grasping the door extension 54 and pushing it downward to disengage the latching arm ear 60 from the arched section 64. The door 34 is then moved clockwise (as viewed in FIG. 3) to completely free the latching arm 56 from the arched section 64. Thereafter, the downward force on the door 34 is relieved, the door is rotated further clockwise toward the open position until the locking arm 74 has passed over the inclined edge 82 of the latching bracket 80. The door 34 is then pushed downwardly to move the inner end portion 76 of the lower locking arm 74 into the locking bracket slot 84 as shown in FIG. 2. Thus, the door 34 is thereby locked in an open position and cannot be returned to a closed position so long as the downward force is maintained thereon.

While maintaining the downward force on the door 34, the lower portion of the collection bag frame 30 is moved into its normal installation position adjacent the discharge chute outlet 16 and the upper portion of the collection bag 30 is moved into position and secured in place by the spring latch 28. The lower portion of the collection bag 30 bears down on the trigger arm 86 to overcome the biasing force of the leaf spring 66 (See FIG. 6) and thereby prevent the locking arm 74 from becoming unlocked from the locking bracket 80.

When the grass collection bag 22 is to be removed, it is only necessary to disengage the spring latch 28 from the top portion of the collection bag frame 30 and remove the bag from the discharge chute 14 in the usual manner. As the lower portion of the collection bag frame 30 is disengaged from the trigger arm 86, the leaf spring 66 urges the door upwardly to move the inner end portion 76 of the locking arm 74 out of the locking bracket slot 84. The torsion spring 52 then urges the door 34 to the closed position and the latching arm ear 60 is moved to the latched position behind the arched section 64 (See FIGS. 4 and 6) by the combined biasing actions of the torsion spring 52 and the leaf spring 66. Of course, the door is automatically closed and latched at the same manner any time the collection bag is accidentally removed from the discharge chute 14, such as being pulled off by engagement with shrubs or similar obstructions.

Although the arrangement of the shutter door assembly has been described and illustrated with the door 34 opening laterally towards the mower engine, it can be appreciated that the assembly can be arranged so that the door opens laterally away from the engine. Even though less desirable, the assembly can also be arranged so that the door opens upwardly or downwardly, in which case the trigger arm 86 can be arranged to be engaged by a side of the collection bag frame 30 instead of the bottom of the frame as described above.

What is claimed is:

1. A rotary mower having a blade housing with a grass clipping discharge chute having an outlet, a rotary cutter blade located in said housing, an engine supported on said blade housing and located laterally inwardly from said discharge chute, a grass clipping collection bag having a mouth adapted for attachment to said discharge chute outlet, means for releasably attaching said collection bag mouth to said discharge chute outlet, a door pivotally mounted on said blade housing about a generally vertical axis for movement between a closed position wherein said door covers said discharge chute outlet and an open position wherein said collection bag can be attached to said discharge chute outlet and said door is interposed said engine and said collection bag and is thereby protected by said collection bag from engagement with obstructions exterior of the mower during moving.

2. A rotary mower having a blade housing with a grass clipping discharge chute having an outlet, a rotary cutter blade located in said housing, an engine supported on said blade housing and located laterally from said discharge chute, a grass clipping collection bag having a mouth adapted for attachment to said discharge chute outlet, means for releasably attaching said collection bag mouth to said discharge chute outlet, a shutter door assembly including a door pivotally mounted on said blade housing about a generally vertical axis for movement between a closed position wherein said door covers said discharge chute outlet and an open position wherein said collection bag can be attached to said discharge chute outlet and said door is interposed said engine and said collection bag and is thereby protected by said collection bag from engagement with obstructions exterior of the mower during mowing, means for urging said door toward the closed position, whereby any time said collection bag mouth is moved away from said discharge chute outlet said door is automatically moved to the closed position, and means for releasably latching said door in the closed position such that objects being propelled against said door by said cutter blade will not cause said door to open.

3. A rotary mower having a blade housing with a grass clipping discharge chute having an outlet, a rotary cutter blade located in said housing, a grass clipping collection bag having a mouth adapted for attachment to said discharge chute outlet, means for releasably attaching said collection bag mouth to said discharge chute outlet, a door, means hingedly mounting said door on said blade housing for movement between a closed position wherein said door covers said discharge chute outlet and an open position wherein said collection bag can be attached to said discharge chute outlet, a first spring connection to said door for urging said door toward the closed position, whereby any time said collection bag mouth is moved away from said discharge chute outlet said door is automatically moved to the closed position, and means for releasably and positively latching said door in the closed position such that objects being propelled against said door by said cutter blade will not cause said door to open, said latching means including a latching bracket located on said blade housing adjacent said discharge chute outlet, a latching arm which extends from one edge of said door and which, as said door is urged toward the closed position by said first spring, engages said latching bracket, and means for releasably urging said latching arm into latching engagement with said latching bracket.

4. A rotary mower according to claim 3 wherein said latching arm includes a free end having an upstanding ear with a rear portion, said latching bracket includes an opening for receiving said latching arm ear and having a forward edge portion, said holding means includes a second spring connected to said door for biasing said latching arm relative to said opening such that, when said door is urged to the closed position by said first spring, the rear portion of said latching arm ear engages the forward portion of said opening to prevent said door from opening.

5. A rotary mower having a blade housing with a grass clipping discharge chute having an outlet, a rotary cutter blade located in said housing, a grass clipping collection bag having a mouth adapted for attachment to said discharge chute outlet, means for releasably attaching said collection bag mouth to said discharge chute outlet, a shutter door assembly including a door, means hingedly mounting said door on said blade housing for movement between a closed position wherein said door covers said discharge chute outlet and an open position wherein said collection bag can be attached to said discharge chute outlet, means for urging said door toward the closed position, whereby any time said collection bag mouth is moved away from said discharge chute outlet said door is automatically moved to the closed position, means for releasably latching said door in the closed position such that objects being propelled against said door by said cutter blade will not cause said door to open and means for cooperating with said collection bag mouth to releasably lock said door in the open position when said collection bag mouth is attached to said discharge chute outlet and including a locking bracket located on said blade housing adjacent said discharge chute outlet, a locking member connected to said door for engaging said locking bracket when said door is in the open position, means connected to said door for biasing said locking member out of locking engagement with said locking bracket, and means connected to said door for cooperating with said collection bag mouth to overcome the biasing force of said biasing means and to thereby maintain said locking member in locking engagement with said locking bracket so long as said collection bag mouth is attached to said discharge chute outlet.

6. A rotary mower according to claim 5 wherein said last mentioned means includes a trigger arm connected to said door and having a portion extending into said discharge chute outlet for engagement by the mouth of said collection bag, said trigger arm being depressible by said collection bag mouth to a position where the biasing force of said biasing means is overcome and said locking member is maintained in locking engagement with said locking bracket when said collection bag is attached to said discharge chute outlet.

7. A rotary mower having a blade housing with a grass clipping discharge chute having an outlet, a rotary cutter blade in said housing, a grass clipping collection bag having a mouth adapted for connection to said discharge chute outlet, means for releasably connecting said collection bag mouth to said discharge chute outlet, a door, means hingedly mounting said door on said blade housing for movement between a closed position wherein said door covers said discharge chute outlet and an open position wherein said collection bag can be connected to said discharge chute outlet, first spring means connected to said door for urging said door towards the closed position, a latching arm extending from one edge of said door and including a free end having an upstanding ear with a rear portion, a latching bracket located on said blade housing and including an opening for receiving said latching arm ear and having a forward edge portion, and second spring means connected to said door for biasing said latching arm relative to said opening such that, when said door is urged to the closed position by said first spring means, the rear portion of said latching arm ear engages the forward edge portion of said opening to prevent said door from being opened by objects propelled against said door by said cutter blade.

8. A rotary mower according to claim 7 including a locking bracket located on said blade housing adjacent said discharge chute outlet, a locking member connected to said door for engaging said locking bracket to thereby releasably lock said door in the open position, said second spring means biasing said locking member out of locking engagement with said locking bracket, and a trigger arm connected to said door and including a portion extending into said discharge chute outlet for engagement by the mouth of said collection bag, said trigger being depressible by said collection bag mouth to a position where the biasing force of said second spring means is overcome and said locking member is maintained in locking engagement with said locking bracket when said collection bag is attached to said discharge chute outlet.

* * * * *

PO-1050
(5/69)

UNITED STATES PATENT OFFICE
CERTIFICATE OF CORRECTION

Patent No. 3,872,656          Dated March 25, 1975

Inventor(s)          Einar S. Dahl

It is certified that error appears in the above-identified patent and that said Letters Patent are hereby corrected as shown below:

| | |
|---|---|
| Column 4, line 17, | delete "inner end" |
| Column 4, line 17, | before "portion", insert ---end---. |
| Column 4, line 17, | After "Fig.", insert ---6---. |
| Column 4, line 64 | After "which", insert ---in turn---. |
| Column 6, line 23, | After "laterally", insert ---inwardly---. |

Signed and Sealed this fourth Day of November 1975

[SEAL]

Attest:

RUTH C. MASON
*Attesting Officer*

C. MARSHALL DANN
*Commissioner of Patents and Trademarks*